(12) United States Patent
Chen

(10) Patent No.: US 7,593,709 B2
(45) Date of Patent: Sep. 22, 2009

(54) METHOD FOR MANAGING POWER OF A MOBILE COMMUNICATION DEVICE

(75) Inventor: Tse-Min Chen, Taipei Hsien (TW)

(73) Assignee: Acer Incorporated, Taipei (TW)

( * ) Notice: Subject to any disclaimer, the term of this patent is extended or adjusted under 35 U.S.C. 154(b) by 536 days.

(21) Appl. No.: 11/438,306

(22) Filed: May 23, 2006

(65) Prior Publication Data

US 2007/0049238 A1 Mar. 1, 2007

(30) Foreign Application Priority Data

Aug. 30, 2005 (TW) ............................. 94129762 A

(51) Int. Cl.
*H04B 1/16* (2006.01)

(52) U.S. Cl. ............... 455/343.1; 455/574; 455/552.1; 455/517

(58) Field of Classification Search ............ 455/572, 455/573, 574, 343.1–343.6, 550.1, 556.1, 455/557, 552.1, 517; 348/372; 713/323
See application file for complete search history.

(56) References Cited

U.S. PATENT DOCUMENTS

| 2005/0120255 A1* | 6/2005 | Padawer et al. ............. 713/320 |
| 2006/0090088 A1* | 4/2006 | Choi et al. .................. 713/300 |
| 2006/0194549 A1* | 8/2006 | Janik et al. ................... 455/73 |

* cited by examiner

*Primary Examiner*—John J Lee
(74) *Attorney, Agent, or Firm*—Birch, Stewart, Kolasch & Birch, LLP

(57) ABSTRACT

The method for managing power includes the steps of: setting up a wake up time; checking the power supply status of the mobile communication device during the wake up time, and setting up the power supply status as an initial status; waking up the mobile communication device as the unattended mode, if the initial status is the suspended mode or the off mode, making the mobile communication device connect to the remote server, if the initial status is the on mode; connecting to the remote server and accessing data to the remote server; renewing the wake up time; and shifting the power supply status of the mobile communication device into the initial status and waiting for next-time wake up time.

19 Claims, 4 Drawing Sheets

METHOD FOR MANAGING POWER OF A MOBILE COMMUNICATION DEVICE

BACKGROUND OF THE INVENTION (1) Field of the Invention

The invention relates to a method for managing power, and more particularly, to a method for managing power of a mobile communication device that accesses data through an internet.

(2) Description of the Prior Art

In addition to the basic function of communication, the mobile communication devices have been developed from the second generation voice phone to the third generation video phone, and even include a plurality of functions, such as digital camera, MP3 player, and even global positioning system (GPS). Such functions require more elements, and thus electrical currents are increasing. Compared with the second generation voice phone, power consumption has been nearly doubled. However, consumers hope that the operation time can be longer and that batteries can provide a stable current for a longer time. Therefore, it is the priority for research and development engineers to make the power management excellent to support mobile communication devices of the new generation.

In addition to choosing good rechargeable batteries and to supervising and managing the rechargeable batteries, adjusting, according to use status of the mobile communication device, functions of the elements for reducing the power consumption can make the service lives of the batteries longer. Generally, the mobile communication devices have three power modes, i.e., off mode, on mode, and sleep mode.

When in the off mode, internal elements in the mobile communication device are in the off status. At that time, the communication between the mobile communication device and a base station is cut out. The on mode means that the mobile communication device is in use or in other operations, that the main internal elements, such as central processing unit (CPU) and other peripheral elements, in the mobile communication device consume working voltages, and that only very few elements, such as backlight module, that consumes larger power consumption will be switched off in order to save energy. When the mobile communication device is idle for a certain time, then power status of the mobile communication device will enter the sleep mode. At that time, the CPU enters the sleep status, but the mobile communication device still has the communication with the base station. When the mobile communication device receives calls from the base station, or sensors operation of user, then the mobile communication device will shift from the sleep mode into the on mode.

Please refer to FIG. 1A which shows that the mobile communication device in the prior is in the sleep mode. As shown in FIG. 1A, the mobile communication device 10 includes: a central processing unit 101 and a wireless communication unit 102, wherein the central processing unit (CPU) 101 is connected to the wireless communication unit 102, and the wireless communication unit 102 usually communicates with a base station 11 through radio waves, and registers where the mobile communication device 10 is. When the mobile communication device 10 is idle for a certain time, then the mobile communication device 10 enters the sleep mode. At that time, the voltage that is supplied to the CPU 101 is lowered, and the CPU 101 enters the sleep mode having simplified functions in order to reduce the power consumption, and to extend the service lives of the batteries, moreover, the wireless communication unit 102 still works normally and keeps communicating with the base station 11.

Please refer to FIG. 1B which shows that the mobile communication device in the prior is in the on mode. When the base station 11 transmits a call signal to the mobile communication device 10, then the wireless communication unit 102 will stop the sleep mode of the CPU 101, so that the CPU 101 will return back to the on mode that consumes working voltage, and then the mobile communication device 10 will enter the on mode.

With the fast development of mobile communication technology, user can contact the internet to browse information, and even can receive and send e-mails, especially, the new generation people always focus on receiving the e-mails. When a new e-mail that is going to be sent to the user is sent to a mail server, then system will send a short message service (SMS) to the mobile communication device, and then the user will receive the e-mail through operation of the user himself.

However, when the aforesaid mobile communication device 10 is in the off mode, which means that the communication with outside is stopped, then the user cannot know the real-time information. To businessmen who emphasize the information, it is a pity that they cannot know the real-time information.

On the other hand, in order to increase the convenience of the mobile communication device, the portable mobile communication device should have a function of an automatically accessing data to the internet for the user to browse whenever and wherever.

However, when the mobile communication device 10 is connected to the internet through the TCP/IP, the CPU 101 is required to carry out such a connection. If the CPU 101 is in the sleep mode, then the mobile communication device cannot be connected to the internet and thus, cannot access data. If the CPU 101 is always in the on mode in order to be connected to the internet, then the energy of the battery will be consumed rapidly, and thus duration time of the battery is dramatically shortened.

SUMMARY OF THE INVENTION

It is an object of the present invention to provide a method for managing power of a mobile communication device. Through such a method for managing power, the mobile communication device is waken up to be connected to and to access data to a remote server via the internet, and thus both convenience of accessing data and managing power can be achieved.

The present invention discloses the method for managing power of the mobile communication device, wherein the mobile communication device regularly accesses data to the remote server through the internet. The mobile communication device has four power supply modes, i.e., an off mode, a suspended mode, an unattended mode and an on mode, wherein the unattended mode is a power supply status having simplified functions.

The method for managing power includes the steps of: setting up a wake up time; checking the power supply status of the mobile communication device during the wake up time, and setting up the power supply status as an initial status; waking up the mobile communication device as the unattended mode, if the initial status is the suspended mode or the off mode, making the mobile communication device connect to the remote server, if the initial status is the on mode; connecting to the remote server and accessing data to the remote server; renewing the wake up time; and shifting the power supply status of the mobile communication device into the initial status and waiting for next-time wake up time.

Therefore, through the method for managing power of the mobile communication device disclosed in the present invention, the mobile communication device is automatically connected to and accesses data to the remote server through the internet, so that the user does not need to carry out operation of receiving e-mails, but browses the new data, when the mobile communication device receives the new data; moreover, when in the off mode and suspended mode, whether the new data have arrived or not can be checked in a predetermined time.

In addition, when the mobile communication device is in the off mode or the suspended mode, the power supply status is waken up as the unattended mode having simplified functions in order to access data, and then goes back to the initial status. Such a method for managing power can extend the service lives of the batteries.

BRIEF DESCRIPTION OF THE DRAWINGS

The present invention will now be specified with reference to its preferred embodiment illustrated in the drawings, in which.

DESCRIPTION OF THE PREFERRED EMBODIMENTS

Figure 1A:
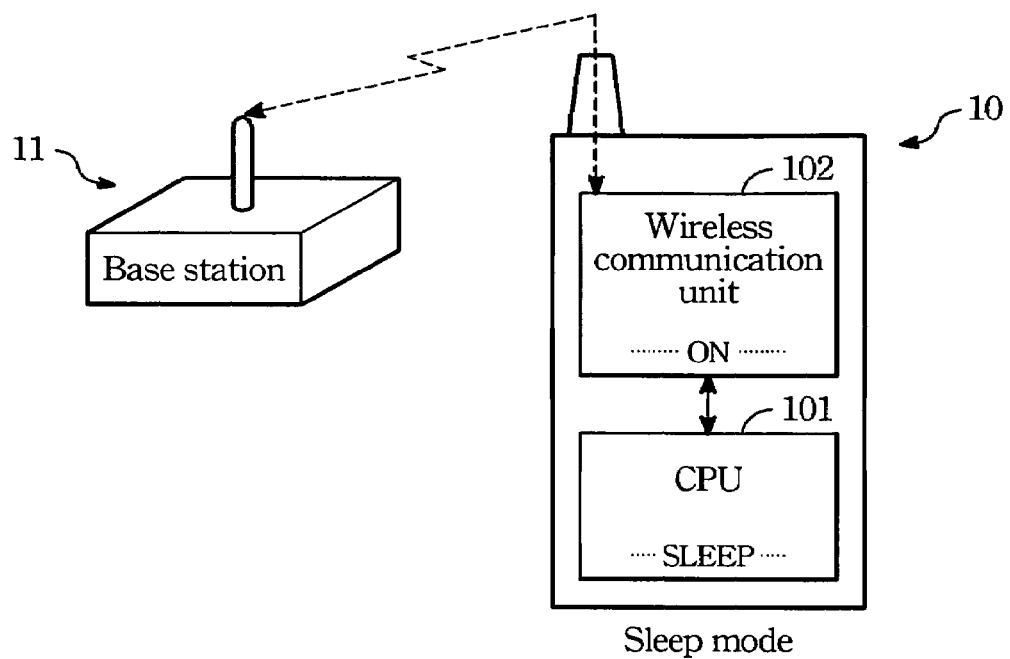
FIG. 1A shows that the mobile communication device in the prior is in the sleep mode.
Figure 1B:
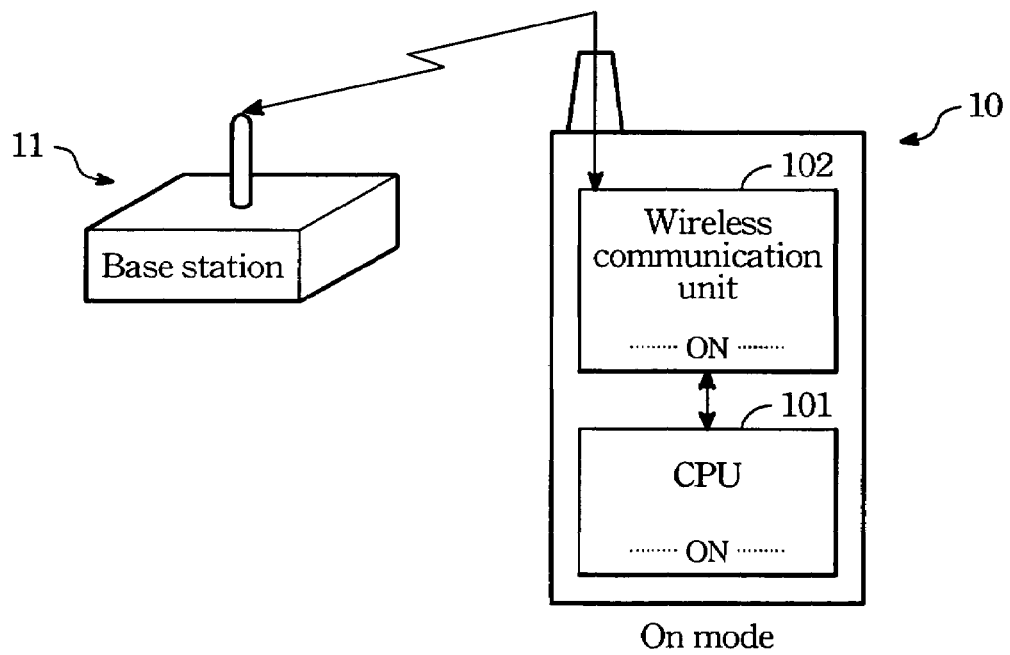
FIG. 1B shows that the mobile communication device in the prior is in the on mode.
Figure 2:
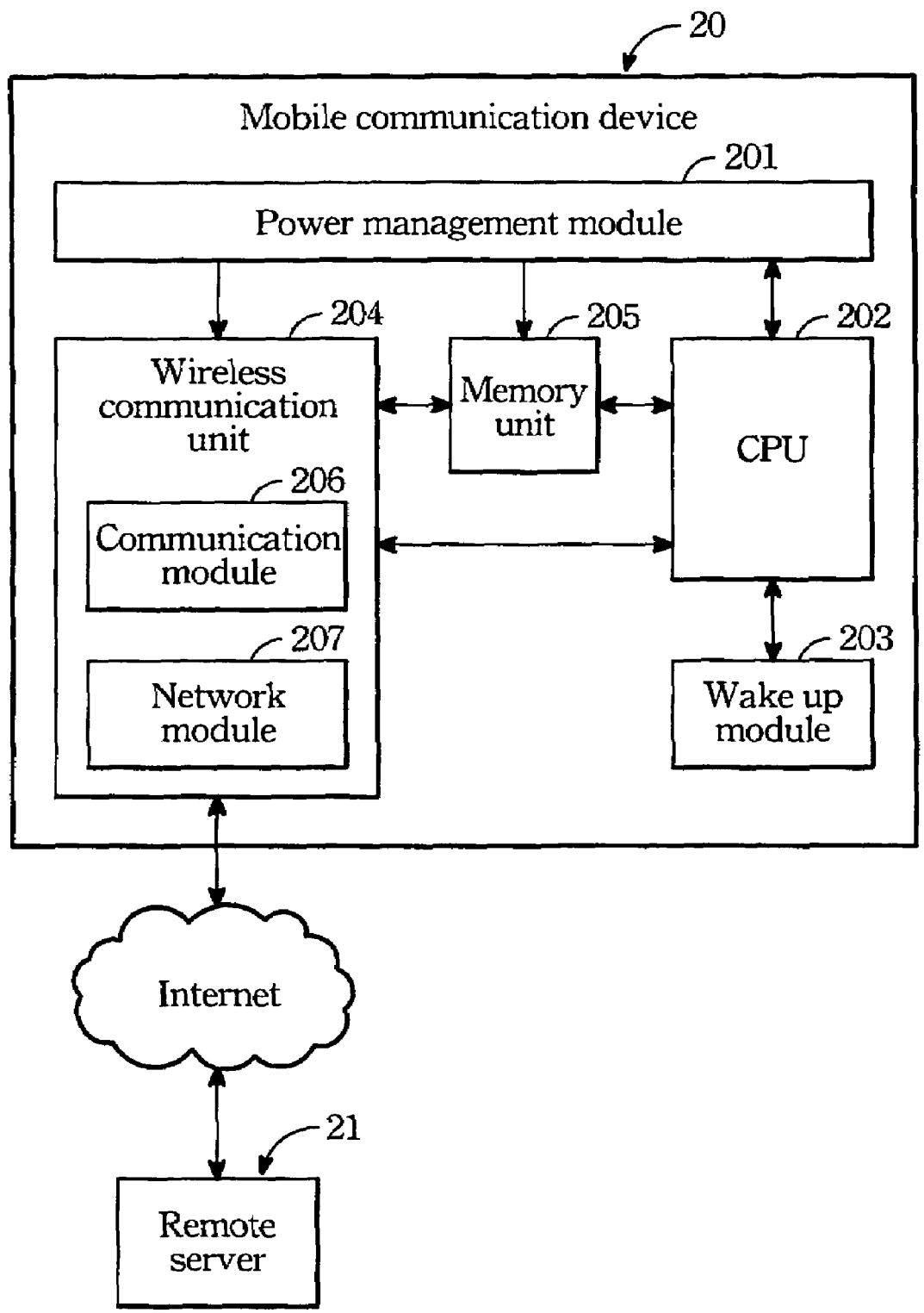
FIG. 2 is a system schematic drawing of the mobile communication device disclosed in the present invention.

First, please refer to FIG. 2 which is the system schematic drawing of the mobile communication device disclosed in the present invention. As shown in FIG. 2, a mobile communication device 20 is connected to and accesses data to a remote server 21 through the internet. The aforesaid data can be e-mails, and the mobile communication device 20 can transmit, according to the TCP/IP protocol, the data to the remote server 21 via the internet, the data format of which data can be TCP packet format or UDP packet format. Again, the mobile communication device 20 can be a mobile phone, personal digital assistant (PDA), smart phone or pocket personal computer, and the remote server 21 can be a computer.

The mobile communication device 20 has four power supply modes, i.e., an off mode, a suspended mode, an unattended mode and an on mode.

As shown in FIG. 2, the mobile communication device 20 includes a power management module 201, CPU 202, wake up module 203, wireless communication unit 204 and memory unit 205. The power management module 201 can supply power to the CPU 202, the wireless communication unit 204, and the memory unit 205 according to power supply status. The CPU 202 in the on mode and in the unattended mode can process data, the CPU 202 in the suspended mode is in a sleep status, and the CPU 202 in the off mode is in an off status. The wake up module 203 sends a wake up signal to the CPU 202 during a wake up time, and the wake up module 203 in the on mode, unattended mode, suspended mode, and off mode is always in on status. The wireless communication unit 204 is used to establish a connection with the remote server 21. The memory unit 205 is used to store the data that is accessed from the remote server 21.

Again, the wireless communication unit 204 includes a communication module 206 and a network module 207. The mobile communication device 20 can be connected to the remote server 21 through the communication module 206 or network module 207. The communication module 206 makes the mobile communication device 20 connect, according to GSM/GPRS or GSM/3G, such as W-CDMA, CDMA2000 etc., to the internet. The network module 207 makes the mobile communication device 20 connect, according to wireless local network area (WLAN), such as Wi-Fi, to the internet.

In addition to the wake up module 203 being in the on status, when the mobile communication device 20 is in the off mode, then other internal elements, such as the CPU 202, wireless communication unit 204, memory unit 205 etc. are in the off status.

When the power supply status is in the suspended mode, then the wake up module 203 is in the on status, the CPU 202 is in a sleep status, and the wireless communication unit 204 keeps communicating with the base station. When there is a call signal from outside, then the suspended mode is stopped and is shifted to the on mode.

When in the suspended mode, the power management module 201 provides the normal working voltage to the CPU 202, wireless communication unit 204, and memory unit 205 etc.

The aforesaid unattended mode is a behind-curtain working mode that will not let the user aware of. Under the unattended mode, display (not shown) of the mobile communication device 20 and other peripheral elements that carry out operations are in the off status; moreover, when the CPU 202 is in the unattended mode, then the working voltage and clock frequency of the CPU 202 are lower than those of the CPU 202 in the on mode, the power management module 201 can even dynamically adjust, according to required intensity of emitting power of radio wave and to required bandwidth of data packet, the voltage that is supplied to the wireless communication unit 204.

Because the aforesaid power supply modes are well-know, such as disclosed in Windows Mobile 5.0 operation system, the detailed descriptions are disregarded here.

Figure 3:
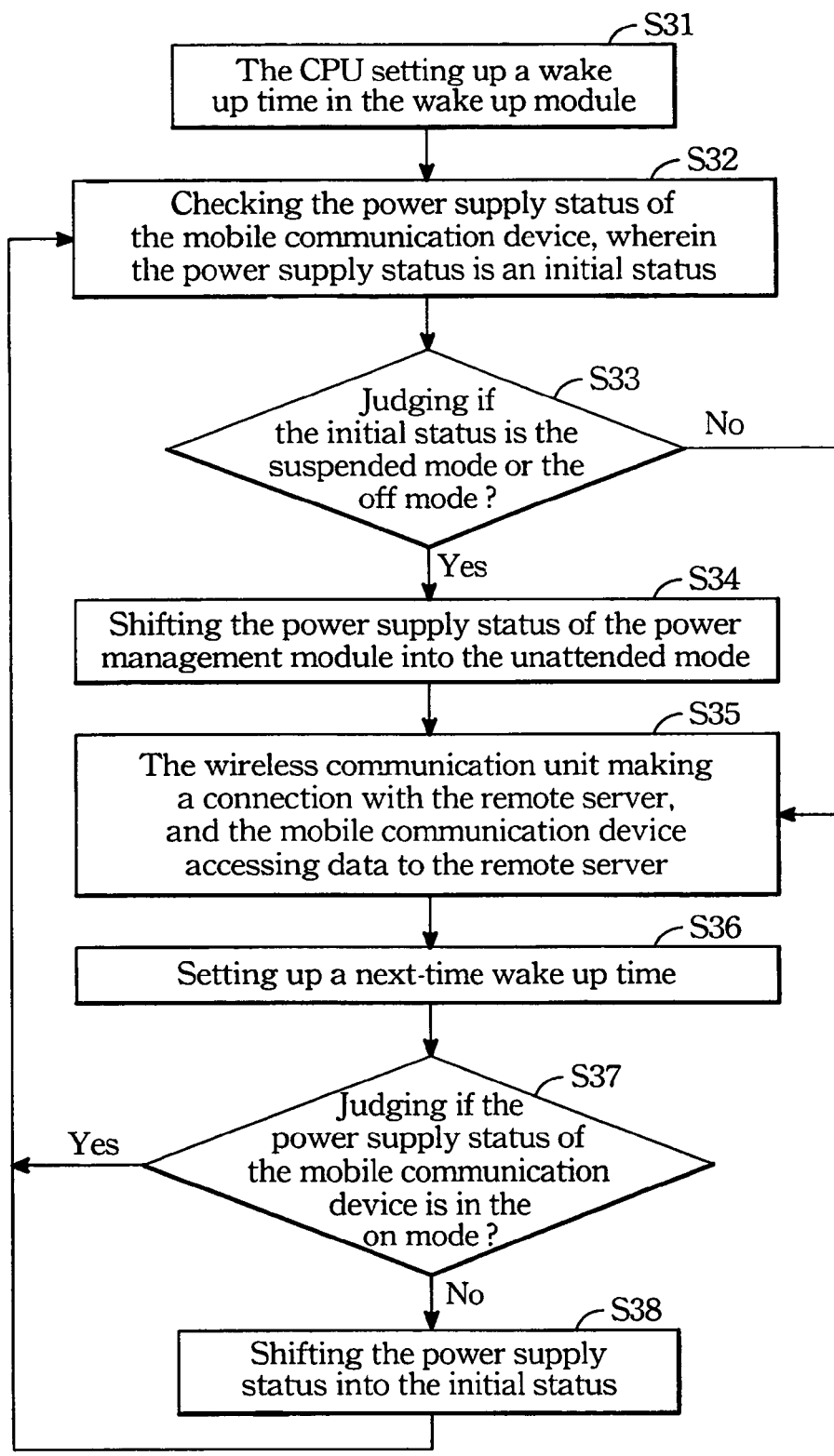
FIG. 3 is a flowchart which shows the steps of the method for managing power of the mobile communication device disclosed in the present invention.

Please refer to FIG. 3 which shows the steps of the method for managing power of the mobile communication device of the present invention. As shown in FIG. 3, the FIG. 3 includes the steps of: the CPU 202 setting up a wake up time in the wake up module 203 (S31); the wake up module 203 sending a wake up signal to the CPU 202 during the wake up time, and then the CPU 202 checking the power supply status of the mobile communication device 20, wherein the power supply status is an initial status (S32); judging if the initial status is the suspended mode or the off mode (S33); shifting the power supply status of the power management module 201 into the unattended mode, the power management module 201 supplying power to the CPU 202, the wireless communication unit 204 and the memory unit 205, if the initial status is the suspended mode or the off mode (S34); the wireless communication unit 204 making a connection with the remote server 21, and the mobile communication device 20 accessing data to the remote server 21 (S35); the CPU 202 setting up a next-time wake up time in the wake up module 203 (S36); judging if the power supply status of the mobile communication device 20 is in the on mode (S37); and shifting the power supply status into the initial status and waiting for next-time wake up time (S38)

In step (S33), if the initial status is not the suspended mode or the off mode, then the wireless communication unit 204 will make a connection with the remote server 21, and the mobile communication device 20 accesses data to the remote server 21 (S35).

Figure 4:
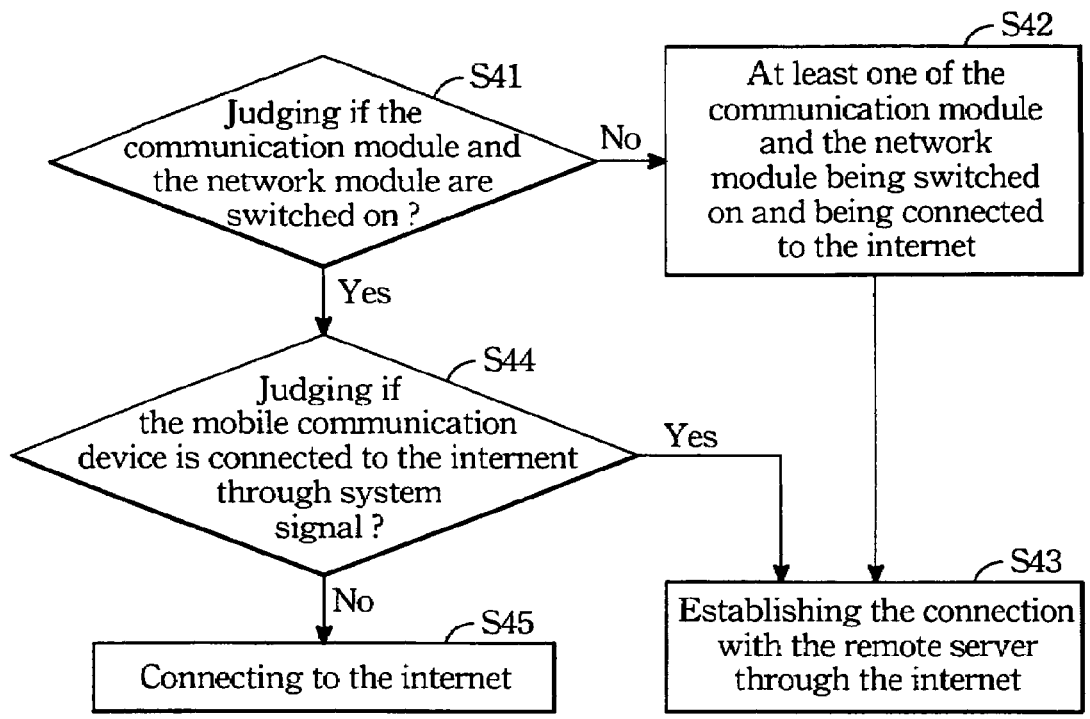
FIG. 4 is a flowchart which shows the steps of connecting to the remote server disclosed in the present invention.

Please refer to FIG. 4 which is a flowchart that further describes the steps of connection with the remote server 21 in the step (S35) disclosed in the present invention. As shown in FIG. 4, judging if the communication module 206 and the network module 207 are switched on (S41); setting up the minimum requirement of working power, and at least one of the communication module 206 and the network module 207 is switched on and is connected to the internet, if the communication module 206 and the network module 207 both are not switched on (S42); and establishing the connection with the remote server 21 through the internet (S43).

In step (S41), judging if the mobile communication device 20 is connected to the internet through system signal, if the communication module 206 or the network module 207 are switched on (S44); connecting to the internet, if the communication module 206 or the network module 207 are not connected to the internet (S45); and establishing the connection with the remote server 21 through the internet (S43).

In step (S44), if the communication module 206 or the network module 207 is connected to the internet, then the connection with the remote server 21 is established through the internet (S43).

Figure 5:
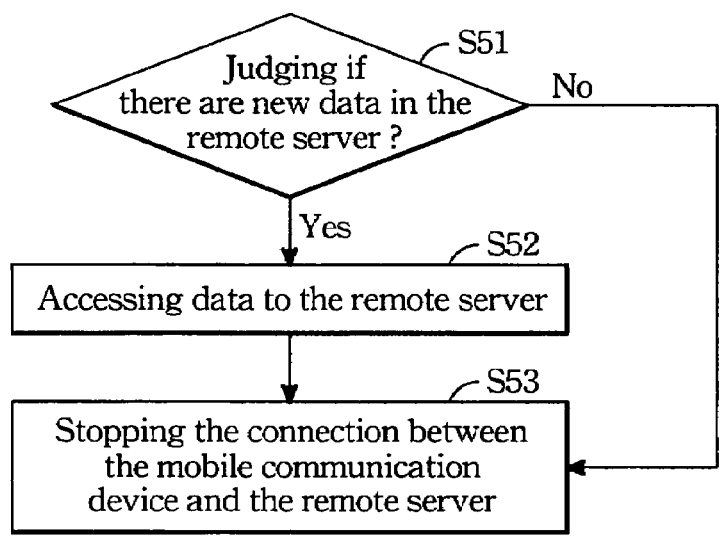
FIG. 5 is a flowchart which shows the steps of accessing data disclosed in the present invention.

Please refer to FIG. 5 which is a flowchart that shows the steps of accessing data disclosed in the present invention. As shown in FIG. 5, judging if there are new data in the remote server 21, after the mobile communication device 20 is connected to the remote server 21 (S51); the mobile communication device 20 accessing data to the remote server 21, and storing the data into the memory unit 205, if the remote server 21 has the new data (S52); and stopping the connection between the mobile communication device 20 and the remote server 21 (S53).

In step (S51), if the remote server 21 does not have the new data, then the connection between the mobile communication device 20 and the remote server 21 is stopped (S53).

Furthermore, when the memory unit 205 stores the new data, then preset signals, such as, message reminding, income call ring tone, and vibration, set up by the user are triggered, so that the user can know there are new data from the remote server 21.

From the above descriptions, through the method for managing power of the mobile communication device of the present invention, the mobile communication device 20 in the suspended mode or in the off mode is waken up as the unattended mode having simplified functions, has low power consumption, and establishes the connection with and accesses data to the remote server 21, so as to have both convenience of accessing data and effective control of the power consumption.

While the present invention has been particularly shown and described with reference to a preferred embodiment, it will be understood by those skilled in the art that various changes in form and detail may be without departing from the spirit and scope of the present invention.

I claim:

1. A method for managing power of a mobile communication device that accesses data to a remote server through an internet, the method comprising the steps of:

(a) setting up a wake up time;
(b) checking a power supply status of the mobile communication device during the wake up time, and setting up the power supply status as an initial status;
(c) waking up the mobile communication device as un unattended mode, if the initial status is a suspended mode or an off mode, or taking the step (d), if the initial status is an on mode;
(d) connecting to the remote server and accessing data to the remote server, wherein the step (d) of accessing data includes the steps of
   (d1) judging if the remote server has the data,
   (d2) accessing data to the remote server, if the remote server has the new data, or taking the step (d3), if the remote server does not have the new data, and
   (d3) stopping the connection between the mobile communication device and the remote server;
(e) renewing the wake up time; and
(f) shifting the power supply status of the mobile communication device into the initial status, and repeating the step (b).

2. The method according to claim 1, wherein in the step (d3), after stopping the connection with the remote server, if there are new data, then preset signals set up by the user are triggered.

3. The method according to claim 1, wherein the step (e) further comprises the steps of: judging if the power supply status of the mobile communication device is in the on mode; and taking the step (b), if the power supply status is in the on mode, or taking the step (f), if the power supply status is not in the on mode.

4. The method according to claim 1, wherein the wake up time in the step (a) is set up in a wake up module.

5. The method according to claim 4, wherein the wake up module in the on mode, the unattended mode, the suspended mode, and the off mode is always in an on status.

6. The method according to claim 1, wherein the wake up module sends a wake up signal to trigger a CPU in the mobile communication device for checking the power supply status.

7. The method according to claim 6, wherein in the step (c), the CPU renews the wake up time in the wake up module.

8. The method according to claim 6, wherein when the CPU is in the suspended mode, then the CPU is in a sleep status.

9. The method according to claim 6, wherein when the CPU is in the unattended mode, then a working voltage and clock frequency of the CPU are lower than those of the CPU in the on mode in order to reduce a power consumption.

10. The method according to claim 1, wherein the mobile communication device further comprises a wireless communication unit, and the step (d) uses the wireless communication unit to establish a connection with the remote server.

11. The method according to claim 10, wherein the mobile communication device further comprises a power management module for dynamically adjusting, according to required intensity of emitting power of radio wave and required bandwidth of data packet, a voltage of the wireless communication unit.

12. The method according to claim 10, wherein the wireless communication unit includes a communication module and a network module, and the wireless communication unit is connected to the remote server through the communication module and the network module.

13. The method according to claim 12, wherein in the step (d), connection with the remote server comprises the steps of:
   (d1) judging if the communication module and the network module are switched on;

(d2) switching on at least one of the communication module and the network module and connecting to the internet, if the communication module and the network module both are not switched on; and (d3) establishing the connection with the remote server through the internet.

14. The method according to claim 13, wherein in the step (d1), if the communication module and the network module both are switched on, then take the steps of:

(d11) judging if the mobile communication device is connected to the internet; and (d12) connecting to the internet, if not connected to the internet, and establishing the connection with the remote server through the internet.

15. The method according to claim 14, wherein in the step (d11), if already connected to the internet, then the connection with the remote server is established through the internet.

16. The method according to claim 12, wherein the communication module connects the mobile communication device to the internet according to a GSM/GPRS or GSM/3G.

17. The method according to claim 12, wherein the communication module connects the mobile communication device to the internet through a wireless network technology.

18. The method according to claim 1, wherein the data are e-mails.

19. The method according to claim 1, wherein transmission of the data is transmitted according to a TCP/IP protocol and in a TCP packet format or UDP packet format.

* * * * *